Feb. 13, 1951 — W. SCHADE ET AL — 2,541,485
TELEPHOTO OBJECTIVES CORRECTED FOR DISTORTION
Filed Aug. 20, 1949

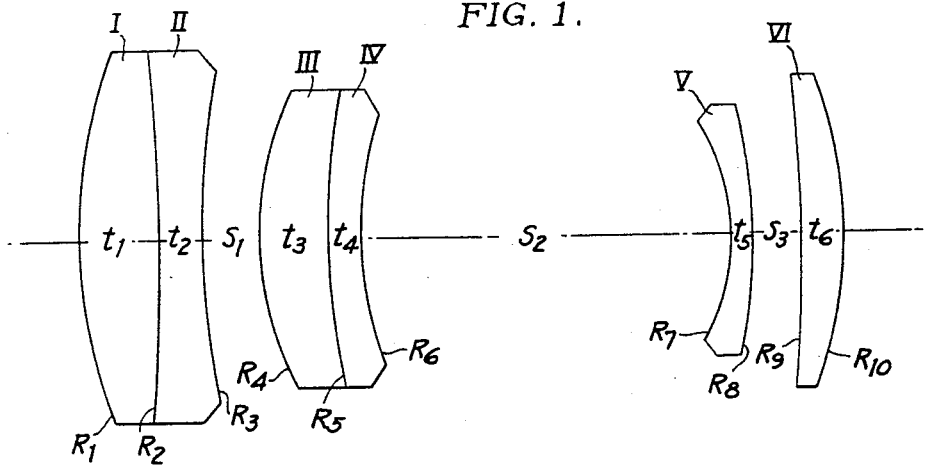

FIG. 1.

FIG. 2.

| EF = 100 mm. | | | | f/5.6 |
|---|---|---|---|---|
| LENS | $N_D$ | V | RADII | THICKNESSES |
| I | 1.517 | 64.5 | $R_1$ = + 30.03 mm. | $t_1$ = 4.81 mm. |
| II | 1.617 | 36.6 | $R_2$ = − 214.0 | $t_2$ = 2.09 |
|   |       |      | $R_3$ = + 68.50 | $S_1$ = 3.57 |
| III | 1.517 | 64.5 | $R_4$ = + 19.09 | $t_3$ = 4.08 |
| IV | 1.621 | 36.2 | $R_5$ = + 55.84 | $t_4$ = 1.80 |
|   |       |      | $R_6$ = + 26.83 | $S_2$ = 22.52 |
| V | 1.638 | 55.5 | $R_7$ = − 12.37 | $t_5$ = 1.31 |
|   |       |      | $R_8$ = − 32.73 | $S_3$ = 3.13 |
| VI | 1.617 | 38.5 | $R_9$ = − 107.3 | $t_6$ = 2.68 |
|   |       |      | $R_{10}$ = − 27.83 | BF = 38.88 |

FIG. 3.

| EF = 100 mm. | | | | f/6.3 |
|---|---|---|---|---|
| LENS | $N_D$ | V | RADII | THICKNESSES |
| I | 1.517 | 64.5 | $R_1$ = + 37.67 mm. | $t_1$ = 2.38 mm. |
| II | 1.617 | 36.6 | $R_2$ = − 52.87 | $t_2$ = 1.56 |
|   |       |      | $R_3$ = + 174.6 | $S_1$ = 2.95 |
| III | 1.517 | 64.5 | $R_4$ = + 18.08 | $t_3$ = 2.05 |
| IV | 1.617 | 36.6 | $R_5$ = + 29.12 | $t_4$ = 1.23 |
|   |       |      | $R_6$ = + 24.15 | $S_2$ = 28.12 |
| V | 1.697 | 56.2 | $R_7$ = − 13.18 | $t_5$ = 1.31 |
|   |       |      | $R_8$ = − 38.84 | $S_3$ = 3.12 |
| VI | 1.745 | 45.6 | $R_9$ = ∞ | $t_6$ = 2.62 |
|   |       |      | $R_{10}$ = − 38.53 | BF = 39.80 |

WILLY SCHADE
WESLEY H. VAN GRAAFEILAND
INVENTORS

BY Daniel I. Mayne
Harold F. Bennett
ATTORNEY & AGENT

Patented Feb. 13, 1951

2,541,485

UNITED STATES PATENT OFFICE 2,541,485

TELEPHOTO OBJECTIVES CORRECTED FOR DISTORTION

Willy Schade and Wesley H. Van Graafeiland, Rochester, N. Y., assignors to Eastman Kodak Company, Rochester, N. Y., a corporation of New Jersey Application August 20, 1949, Serial No. 111,532

3 Claims. (Cl. 88—57)

This invention relates to telephoto objectives, that is objectives consisting of a front positive member and a rear negative member.

The object of the invention is to provide a very highly corrected telephoto lens covering an angular field of about 10° or 12° from the axis and having a total length (from front surface to principal focal plane) of about 80% to 90% of the equivalent focal length.

It is a particular object of the invention to provide a telephoto objective which is particularly well corrected for distortion.

It is well known to designers of telephoto lenses that the difficulties involved in correcting the zonal spherical aberration for any specified aperture and the distortion for any specified angle of field increase tremendously with any increase in the telephoto effect or decrease in the total length beyond certain moderate values. The telephoto effect is customarily defined as the ratio of the focal length of the objective to that of the front member alone. The total length is in some respects a more practical measure of the telephoto effect, however, because it takes into account the thicknesses of the lens components and indicates what degree of compactness has been achieved in comparison with other lens types.

The present invention is a specific improvement over Patent No. 2,382,669 to one of us, and has been specifically applied to objectives having a total length between 0.8 F. and 0.9 F.

According to the present invention a telephoto objective is made up consisting of two front positive cemented doublets and a rear negative airspaced doublet and in which the radii of curvature R of the several surfaces, the thicknesses $t$ of the lens elements, the airspaces $s$, and the refractive indices N of the lens elements for the D line of the spectrum, each numbered by subscripts from front to rear, are within the limits set forth as follows:

$0.2\ F < +R_1 < 0.5\ F$
$3.5 < (F/R_1 - F/R_2) < 5.0$
$1.75 < (F/R_1 - F/R_3) < 2.25$
$0.15\ F < +R_4 < 0.25\ F$
$0.25\ F < +R_5 < 0.7\ F$
$R_4 < +R_6 < 1.5 R_4$
$0.1\ F < -R_7 < 0.15\ F$
$4.0 < (F/R_8 - F/R_7) < 5.5$
$F < \pm R_9$
$2.0 < (F/R_9 - F/R_{10}) < 3.0$ $0.03\ F < (t_1 + t_2) < 0.1\ F$
$0.00 < s_1 < 0.07\ F$
$0.03\ F < (t_3 + t_4) < 0.1\ F$
$0.14\ F < s_2 < 0.35\ F$
$0.01\ F < t_5 < 0.05\ F$
$0.02\ F < s_3 < 0.09\ F$
$0.02\ F < t_6 < 0.07\ F$
$1.48 < N_1 < 1.62$
$0.06 < (N_2 - N_1) < 0.20$
$1.48 < N_3 < 1.62$
$0.06 < (N_4 - N_3) < 0.20$
$1.62 < N_5 < 1.80$
$1.58 < N_6 < 1.80$ where F is the equivalent focal length of the objective and where + and − values of the R's indicate surfaces respectively convex and concave to the front.

From the above table it can be seen that, as compared with the examples shown in the above-mentioned patent, objectives according to the present invention are characterized by a stronger front doublet as indicated by the function $(F/R_1 - F/R_3)$, a somewhat different shape of the second doublet whereby $R_6 < 1.5 R_4$, a higher index of refraction $N_5$ in the negative element of the rear doublet, a larger space $s_3$ within the rear doublet, and weaker individual elements in the rear doublet as shown by the functions $(F/R_8 - F/R_7)$ and $(F/R_9 - F/R_{10})$. The differences between the curvatures $(F/R_1 - F/R_2)$, $(F/R_1 - F/R_3)$, $(F/R_8 - F/R_7)$ and $(F/R_9 - F/R_{10})$ are approximate measures of the powers of the front element, the front doublet, and the two elements of the rear doublet, respectively. Likewise, the ratio of $R_6$ to $R_4$ is a measure of the shape of the second doublet. These relationships between the curvatures are essential to the best working of the invention, and hence the invention is more accurately defined by specifying these relationships than by specifying each radius of curvature directly.

By means of these features, we are able to maintain a high degree of correction of the aberrations affecting image sharpness while controlling the distortion. We have discovered that the distortion can be controlled by varying the rear space $s_3$ and to a lesser degree by the curvatures of the surfaces bordering this space, and in fact can be overcorrected by a moderate increase in this space.

In the accompanying drawings, Fig. 1 shows an objective according to the invention and Figs. 2 and 3 show specifications for two specific embodiments thereof.

The data tables of Figs. 2 and 3 are repeated below, the focal length being 100 mm. in each case:

*Example 1, f/5.6*

| Lens | N | V | Radii | Thicknesses |
|---|---|---|---|---|
| I | 1.517 | 64.5 | $R_1=+30.03$ mm. | $t_1=4.81$ mm. |
| II | 1.617 | 36.6 | $R_2=-214.0$ | $t_2=2.09$ |
|  |  |  | $R_3=+68.50$ | $s_1=3.57$ |
| III | 1.517 | 64.5 | $R_4=+19.09$ | $t_3=4.08$ |
| IV | 1.621 | 36.2 | $R_5=+55.84$ | $t_4=1.80$ |
|  |  |  | $R_6=+26.83$ | $s_2=22.52$ |
| V | 1.638 | 55.5 | $R_7=-12.37$ | $t_5=1.31$ |
|  |  |  | $R_8=-32.73$ | $s_3=3.13$ |
| VI | 1.617 | 38.5 | $R_9=-107.3$ | $t_6=2.68$ |
|  |  |  | $R_{10}=-27.83$ | $BF=38.88$ |

*Example 2, f/6.3*

| Lens | N | V | Radii | Thicknesses |
|---|---|---|---|---|
| I | 1.517 | 64.5 | $R_1=+37.67$ mm. | $t_1=2.38$ mm. |
| II | 1.617 | 36.6 | $R_2=-52.87$ | $t_2=1.56$ |
|  |  |  | $R_3=+174.6$ | $s_1=2.95$ |
| III | 1.517 | 64.5 | $R_4=+18.08$ | $t_3=2.05$ |
| IV | 1.617 | 36.6 | $R_5=+29.12$ | $t_4=1.23$ |
|  |  |  | $R_6=+24.15$ | $s_2=28.12$ |
| V | 1.697 | 56.2 | $R_7=-13.18$ | $t_5=1.31$ |
|  |  |  | $R_8=-38.84$ | $s_3=3.12$ |
| VI | 1.745 | 45.6 | $R_9=\infty$ | $t_6=2.62$ |
|  |  |  | $R_{10}=-38.53$ | $BF=39.80$ |

A third example, illustrating slight overcorrection of the distortion, has specifications as follows:

*Example 3, f/5.6*

| Lens | N | V | Radii | Thicknesses |
|---|---|---|---|---|
| I | 1.517 | 64.5 | $R_1=+23.04$ mm. | $t_1=4.92$ mm. |
| II | 1.617 | 36.6 | $R_2=+569.2$ | $t_2=2.17$ |
|  |  |  | $R_3=+41.81$ | $s_1=0.25$ |
| III | 1.517 | 64.5 | $R_4=+15.59$ | $t_3=4.33$ |
| IV | 1.649 | 33.8 | $R_5=+37.00$ | $t_4=2.00$ |
|  |  |  | $R_6=+18.91$ | $s_2=16.47$ |
| V | 1.697 | 56.1 | $R_7=-10.60$ | $t_5=1.39$ |
|  |  |  | $R_8=-20.50$ | $s_3=8.20$ |
| VI | 1.689 | 30.9 | $R_9=+263.0$ | $t_6=2.56$ |
|  |  |  | $R_{10}=-48.26$ | $BF=44.37$ |

In these tables, the lens elements are numbered in order from front to rear in the first column, the respective refractive indices N for the D line of the spectrum and the Abbe numbers V are given in the second and third columns, and the radii of curvature R, the thicknesses $t$ of the lens elements, and the spaces $s$ between lens elements, each numbered by subscripts from front to rear, are given in the last two columns. The back focal length BF is also given. The + and − values of R denote surfaces respectively convex and concave to the front.

The rear air space $s_3$ and the distortion at 9° and 11° from the axis are as follows for the three examples:

| Example | $s_3$ | 9° Distortion | 11° Distortion |
|---|---|---|---|
| 1 | 3.13 mm. | +0.185 mm. | +0.336 mm. |
| 2 | 3.12 | +0.025 | +0.028 |
| 3 | 8.20 | −0.054 | −0.115 |

These values are given in accordance with the usual definition of distortion, i. e. the displacement from the Gaussian image point. Example 3 shows that the distortion can be overcorrected by a sufficiently large rear airspace $s_3$. However, the most desirable degree of correction is not that for which the distortion is zero at some specific angle but rather it is that for which the distortion is most nearly proportional to the tangent of the field angle. It can be shown that straight lines are reproduced most nearly as straight lines when this condition is most nearly fulfilled. This condition is almost exactly met in Example 2.

Examples 1 and 3 were designed to be made up in a focal length of about 10″, and Example 2 is intended for a somewhat longer focal length and accordingly has somewhat thinner lens elements for economy of manufacture.

The total length of each objective is found by adding together all the numbers in the last column of the data tables, and is between 80 mm. and 90 mm. in each case.

The differences in curvatures and the ratio of radii for which limits are set forth above are as follows in the three examples respectively:

| Example No. | 1 | 2 | 3 |
|---|---|---|---|
| $F/R_1-F/R_2$ | 3.80 | 4.55 | 4.52 |
| $F/R_1-F/R_3$ | 1.87 | 2.08 | 1.95 |
| $F/R_5-F/R_7$ | 5.03 | 5.01 | 4.56 |
| $F/R_9-F/R_{10}$ | 2.66 | 2.60 | 2.45 |
| $R_6/R_4$ | 1.41 | 1.34 | 1.21 |

Each of these values is well within the limits set forth. The remaining values for which limits are set forth are readily determined from the data tables, and it is readily seen that each example embodies all the features of the invention. It is by these features that a high degree of correction was attained.

We claim:

1. A telephoto objective consisting of two front positive cemented doublets and a rear negative airspaced doublet in which the radii of curvature R of the lens surfaces, the thicknesses $t$ of the lens elements, the airspaces $s$, and the refractive indices N of the lens elements for the D line of the spectrum are within the limits set forth as follows:

$$0.2\ F < +R_1 < 0.5\ F$$
$$3.5 < (F/R_1 - F/R_2) < 5.0$$
$$1.75 < (F/R_1 - F/R_3) < 2.25$$
$$0.15\ F < +R_4 < 0.25\ F$$
$$0.25\ F < +R_5 < 0.7\ F$$
$$R_4 < +R_6 < 1.5\ R_4$$
$$0.1\ F < -R_7 < 0.15\ F$$
$$4.0 < (F/R_8 - F/R_7) < 5.5$$
$$F < \pm R_9$$
$$2.0 < (F/R_9 - F/R_{10}) < 3.0$$
$$0.03\ F < (t_1 + t_2) < 0.1\ F$$
$$0.00 < s_1 < 0.07\ F$$
$$0.03\ F < (t_3 + t_4) < 0.1\ F$$
$$0.14\ F < s_2 < 0.35\ F$$
$$0.01\ F < t_5 < 0.05\ F$$
$$0.02\ F < s_3 < 0.09\ F$$
$$0.02\ F < t_6 < 0.07\ F$$
$$1.48 < N_1 < 1.62$$
$$0.06 < (N_2 - N_1) < 0.20$$
$$1.48 < N_3 < 1.62$$
$$0.06 < (N_4 - N_3) < 0.20$$
$$1.62 < N_5 < 1.80$$
$$1.58 < N_6 < 1.80$$

where F is the equivalent focal length of the objective and where + and − values of the R's indicate surfaces respectively convex and concave to the front.

2. An objective as claimed in claim 1 made substantially according to the following specifications:

| Lens | N | V | Radii | Thicknesses |
|---|---|---|---|---|
| I | 1.52 | 65 | $R_1 = +0.3 F$ | $t_1 = .05 F$ |
| II | 1.62 | 37 | $R_2 = -2 F$ | $t_2 = .02 F$ |
|  |  |  | $R_3 = +0.7 F$ | $s_1 = .04 F$ |
| III | 1.52 | 65 | $R_4 = +0.2 F$ | $t_3 = .04 F$ |
| IV | 1.62 | 36 | $R_5 = +0.6 F$ | $t_4 = .02 F$ |
|  |  |  | $R_6 = +0.3 F$ | $s_2 = .22 F$ |
| V | 1.64 | 56 | $R_7 = -0.12 F$ | $t_5 = .01 F$ |
|  |  |  | $R_8 = -0.3 F$ | $s_3 = .03 F$ |
| VI | 1.62 | 38 | $R_9 = -1.1 F$ | $t_6 = .03 F$ |
|  |  |  | $R_{10} = -0.3 F$ |  | where the lens elements are numbered in the first column in order from front to rear and the corresponding refractive indices and V values are given in the next two columns, where the radii R, thicknesses $t$ and spaces $s$, each numbered from front to rear, are given in the last two columns, where F is the focal length of the objective, and where the $+$ and $-$ values of R indicate surfaces respectively convex and concave to the front.

3. An objective as claimed in claim 1 made substantially according to the following specifications:

| Lens | N | V | Radii | Thicknesses |
|---|---|---|---|---|
| I | 1.52 | 65 | $R_1 = 0.4 F$ | $t_1 = .02 F$ |
| II | 1.62 | 37 | $R_2 = -0.5 F$ | $t_2 = .01 F$ |
|  |  |  | $R_3 = +1.7 F$ | $s_1 = .03 F$ |
| III | 1.52 | 65 | $R_4 = +0.2 F$ | $t_3 = .02 F$ |
| IV | 1.62 | 37 | $R_5 = +0.3 F$ | $t_4 = .01 F$ |
|  |  |  | $R_6 = +0.2 F$ | $s_2 = .28 F$ |
| V | 1.70 | 56 | $R_7 = -0.13 F$ | $t_5 = .01 F$ |
|  |  |  | $R_8 = -0.4 F$ | $s_3 = .03 F$ |
| VI | 1.74 | 46 | $R_9 = \infty$ | $t_6 = .03 F$ |
|  |  |  | $R_{10} = -0.4 F$ |  | where the lens elements are numbered in the first column in order from front to rear and the corresponding refractive indices and V values are given in the next two columns, where the radii R, thicknesses $t$ and spaces $s$, each numbered from front to rear, are given in the last two columns, where F is the focal length of the objective, and where the $+$ and $-$ values of R indicate surfaces respectively convex and concave to the front.

WILLY SCHADE.
WESLEY H. VAN GRAAFEILAND.

REFERENCES CITED

The following references are of record in the file of this patent:

UNITED STATES PATENTS

| Number | Name | Date |
|---|---|---|
| 1,791,276 | Konig | Feb. 3, 1931 |
| 2,321,973 | Bennett | Jan. 15, 1943 |
| 2,378,170 | Aklin | June 12, 1945 |
| 2,382,669 | Schade | Aug. 14, 1945 |

FOREIGN PATENTS

| Number | Country | Date |
|---|---|---|
| 222,709 | Great Britain | Oct. 9, 1924 |